United States Patent
Teraoka

(10) Patent No.: US 7,860,378 B2
(45) Date of Patent: Dec. 28, 2010

(54) BAFFLE DEVICE, HOT AIR BLOWER FOR SOLDER TREATMENT, AND NOZZLE FOR SAME

(75) Inventor: Yoshitomo Teraoka, Osaka (JP)

(73) Assignee: Hakko Corporation, Osaka (JP)

( * ) Notice: Subject to any disclaimer, the term of this patent is extended or adjusted under 35 U.S.C. 154(b) by 613 days.

(21) Appl. No.: 11/814,166

(22) PCT Filed: Jan. 18, 2005

(86) PCT No.: PCT/JP2005/000516

§ 371 (c)(1),
(2), (4) Date: Jul. 17, 2007

(87) PCT Pub. No.: WO2006/077618

PCT Pub. Date: Jul. 27, 2006

(65) Prior Publication Data

US 2009/0034945 A1 Feb. 5, 2009

(51) Int. Cl.
*A61H 33/08* (2006.01)
*F01P 7/02* (2006.01)

(52) U.S. Cl. ........................ 392/379; 236/34

(58) Field of Classification Search ................ 392/379, 392/380–385; 236/34, 92 C, 93 R
See application file for complete search history.

(56) References Cited

U.S. PATENT DOCUMENTS

| | | | | |
|---|---|---|---|---|
| 1,745,239 A | * | 1/1930 | Bahnson | 236/44 C |
| 2,484,000 A | * | 10/1949 | MacGeorge | 137/85 |
| 2,507,673 A | * | 5/1950 | Merrill | 165/254 |
| 2,666,443 A | * | 1/1954 | Eckman | 137/84 |
| 2,738,719 A | | 3/1956 | Caldwell | |
| 4,815,664 A | | 3/1989 | Tuthill et al. | |
| 6,085,998 A | | 7/2000 | Yokoyama | |

FOREIGN PATENT DOCUMENTS

| | | |
|---|---|---|
| FR | 2 461 136 | 1/1981 |
| GB | 1 152 163 | 5/1969 |
| JP | 43-11220 Y1 | 5/1968 |
| JP | 63250718 * | 10/1988 |
| JP | 3-31496 Y2 | 7/1991 |
| JP | 11-204932 | 7/1999 |
| JP | 2000-153183 | 6/2000 |
| JP | 2002-331358 | 11/2002 |

OTHER PUBLICATIONS

European Search Report for EP 05703753, mailed Feb. 20, 2009, 3 pgs.
International Search Report for PCT/JP2005/000516, mailed Apr. 26, 2005, 2 pgs.

* cited by examiner

*Primary Examiner*—Daniel Robinson
(74) *Attorney, Agent, or Firm*—Squire, Sanders & Dempsey, L.L.P.

(57) ABSTRACT

In a baffle device 20 fixedly provided in an air passage of a mechanism for blowing out hot air to a solder treatment portion, vanes inclined with a predetermined inclination angle with respect to an air flow are provided substantially radially with a predetermined interval. Also, in a nozzle to be attached to the hot air blower for solder treatment, the baffle device 20 is fixedly provided in an in-nozzle air passage. Moreover, in the hot air blower for solder treatment which blows out hot air to the solder treatment portion, the baffle device 20 is fixedly provided in an in-blower air passage.

15 Claims, 16 Drawing Sheets

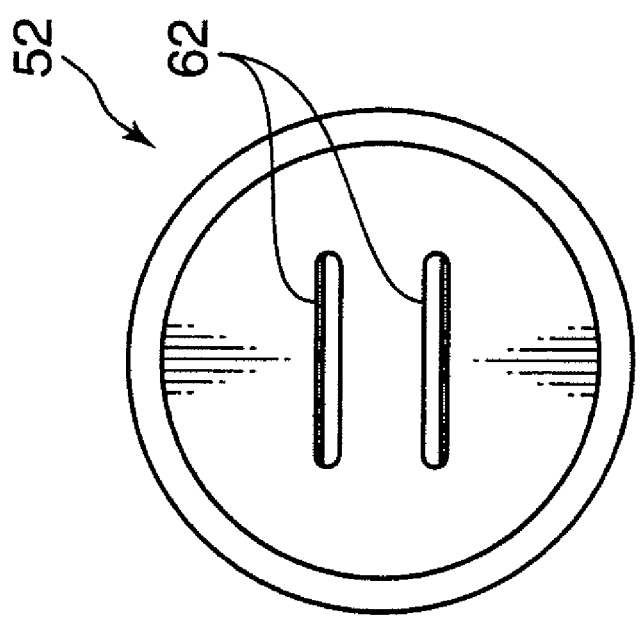
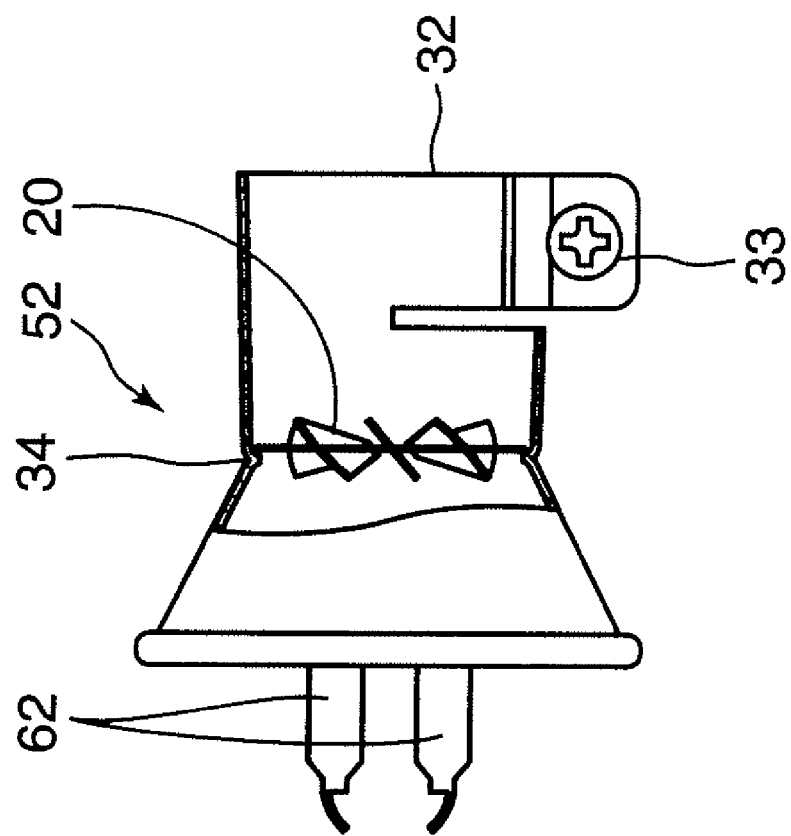
FIG.10A
FIG.10B

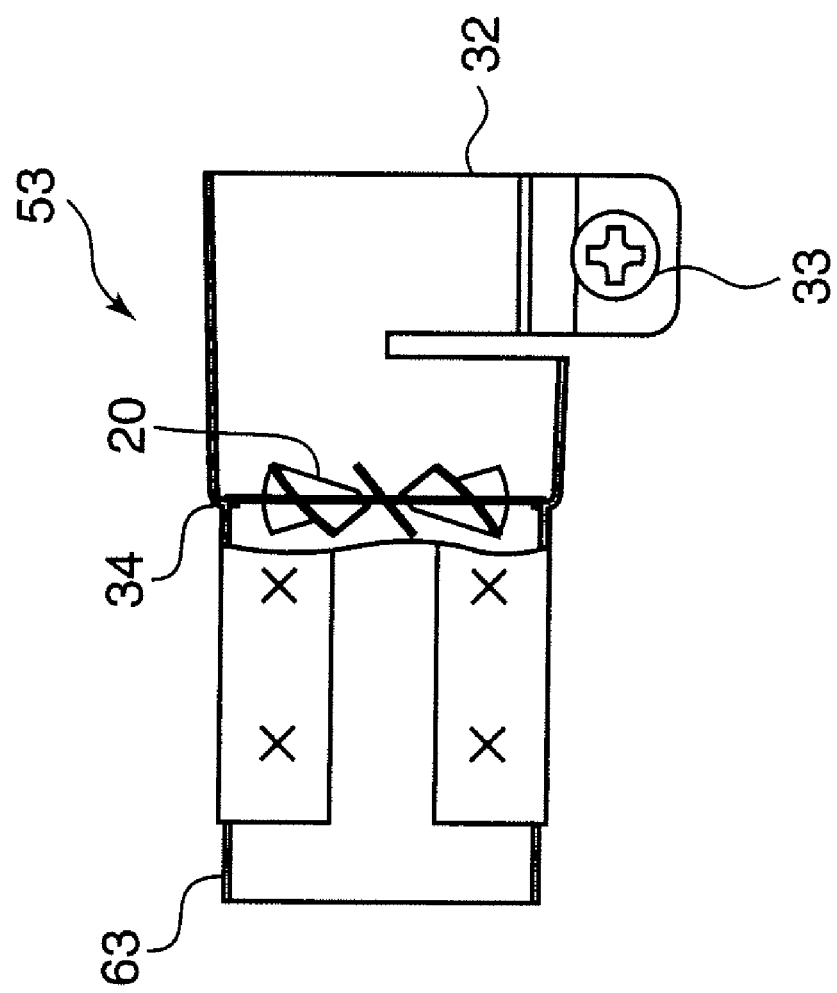
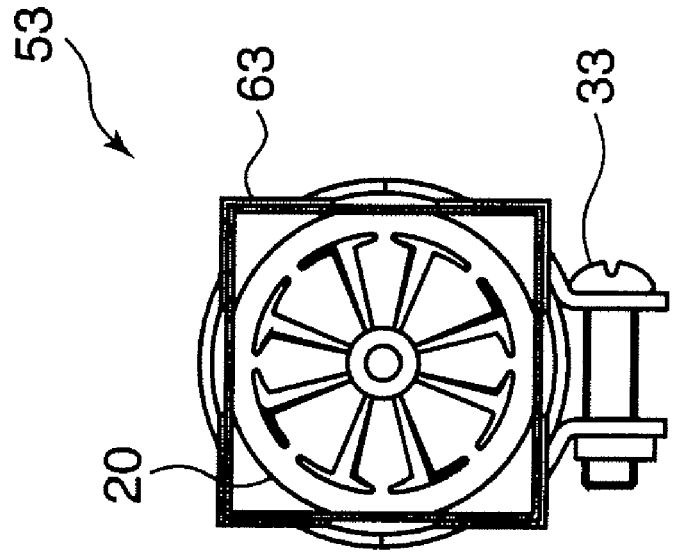

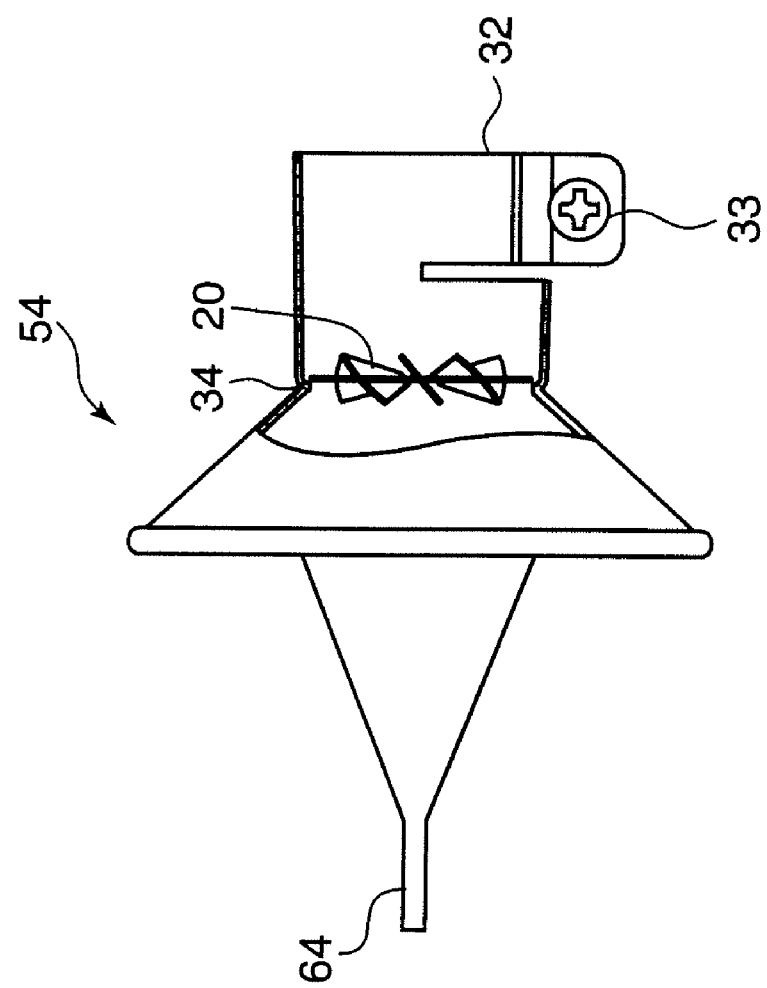
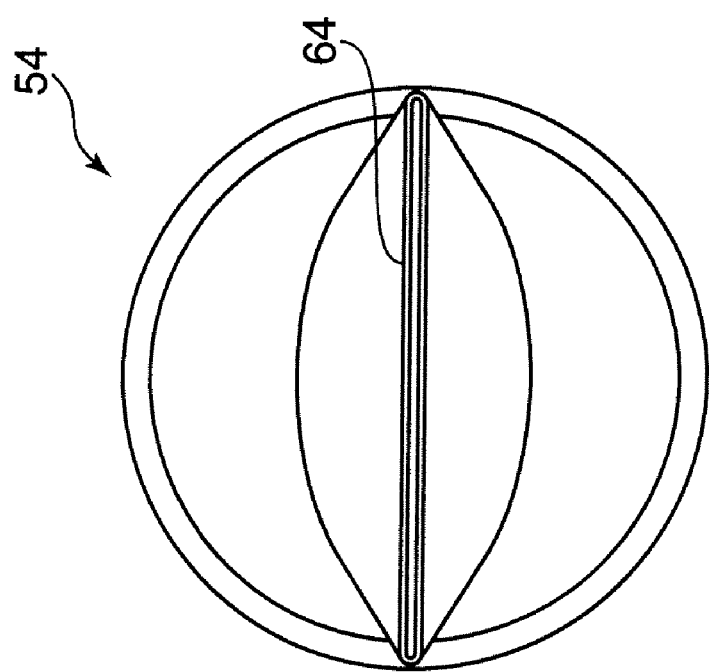
FIG.12B
FIG.12A

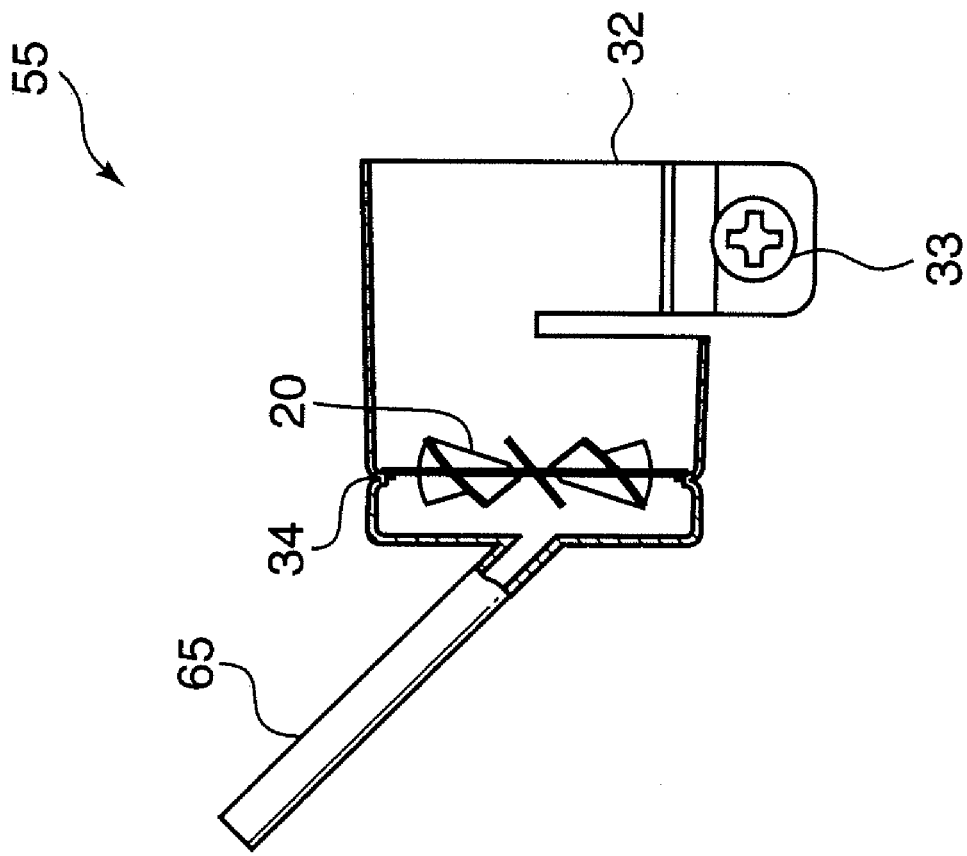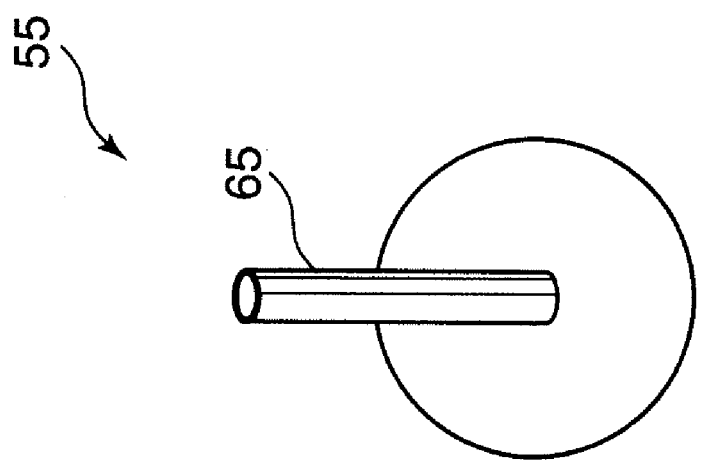

BAFFLE DEVICE, HOT AIR BLOWER FOR SOLDER TREATMENT, AND NOZZLE FOR SAME

BACKGROUND OF THE INVENTION

1. Technical Field

The present invention relates to a hot air blower for solder treatment which blows out hot air to a solder treatment portion at solder treatment such as soldering or removal of soldered parts and particularly to uniformity of temperature distribution of the blown-out hot air.

2. Background Art

At solder treatment such as soldering and removal of soldered parts, a hot air blower for solder treatment (hereinafter also referred to as hot air blower) which blows out hot air to a solder treatment portion has been known. This hot air blower can restrict temperature rise of an electronic part at soldering of an electronic part such as an IC by preheating an electrode portion (solder treatment portion) by the hot air so as to reduce time for soldering. Also, soldering can be carried out by melting the solder by the hot air. Moreover, when an electronic part soldered to a board is to be removed, for example, by blowing the hot air to the soldered portion (solder treatment portion) so as to melt it, the removal can be accomplished without damaging the board or electronic part.

The hot air blower is used by attaching a nozzle to a hot-air blow-out port as appropriate in many cases. The nozzle is a member for guiding the hot air so that the hot air blows to a necessary portion in a concentrated manner. Normally, parts to be soldered are different in size, shape, position of the electrode and the like, and by selectively attaching a nozzle fitted to a target part, favorable solder treatment can be accomplished efficiently.

In this type of hot air blower, it is desirable that temperature distribution of blown-out hot air is even. If the temperature distribution is largely uneven (temperature irregularity), the solder treatment portion might become partially too hot, which could adversely affect the treatment target part, or the temperature might become too low and solder treatment work can be hindered.

Then, a nozzle for making a uniform temperature distribution of the blown-out hot air as shown in Patent Document 1, for example, is proposed. In this nozzle, a hot-air reservoir chamber is provided in the middle of a passage of hot air and a rotating fan for agitation is provided in the reservoir chamber. On the upstream side of the rotating fan, a control plate having a through hole obliquely drilled is provided. And the rotating fan is configured to be driven by having the hot air having passed the through hole obliquely hit the rotating fan.

Patent Document 1: Japanese Utility Model Examined Publication No. 3-31496

However, the nozzle shown in Patent Document 1 has a complicated structure that a through hole is obliquely drilled in a control plate and a fan is rotated and moreover, since a part of thermal energy of the hot air is consumed for driving of the rotating fan, there is a problem that efficiency is poor. Also, since the rotating speed of the fan is fluctuated depending on an air amount of the hot air, the temperature distribution is easily fluctuated by the influence.

SUMMARY OF THE INVENTION

In view of the above circumstances, the present invention has an object to provide a structure which can realize uniformity of temperature distribution of hot air efficiently even with a simple structure.

In order to achieve the above object, according to an aspect of the present invention, a baffle device is fixedly provided in an air passage in a mechanism for blowing out hot air to a solder treatment portion. The baffle device is provided with vanes inclined with a predetermined inclination angle with respect to an air flow substantially radially with a predetermined interval.

BRIEF DESCRIPTION OF THE DRAWINGS

FIG. 4 are views of a baffle device according to the present invention, in which

FIG. 7 are views of the hot air blower of a second embodiment according to the present invention, in which

FIG. 8 are views illustrating a variation of the nozzle of the second embodiment, in which

FIG. 9 are views illustrating a variation of the nozzle of the second embodiment, in which

FIG. 10 are views illustrating a variation of the nozzle of the second embodiment, in which FIG. 10A is a side view and FIG. 10B is a front view having a partial notch.

FIG. 11 are views illustrating a variation of the nozzle of the second embodiment, in which FIG. 11A is a side view and FIG. 11B is a front view having a partial notch.

FIG. 12 are views illustrating a variation of the nozzle of the second embodiment, in which FIG. 12A is a side view and FIG. 12B is a front view having a partial notch.

FIG. 13 are views illustrating a variation of the nozzle of the second embodiment, in which FIG. 13A is a side view and FIG. 13B is a front view having a partial notch.

FIG. 16 are views illustrating a pre-heater as a hot air blower of the fourth embodiment, in which

DETAILED DESCRIPTION OF THE PREFERRED EMBODIMENTS OF THE INVENTION

A best mode for carrying out the present invention will be described below referring to the attached drawings.

Figure 1:
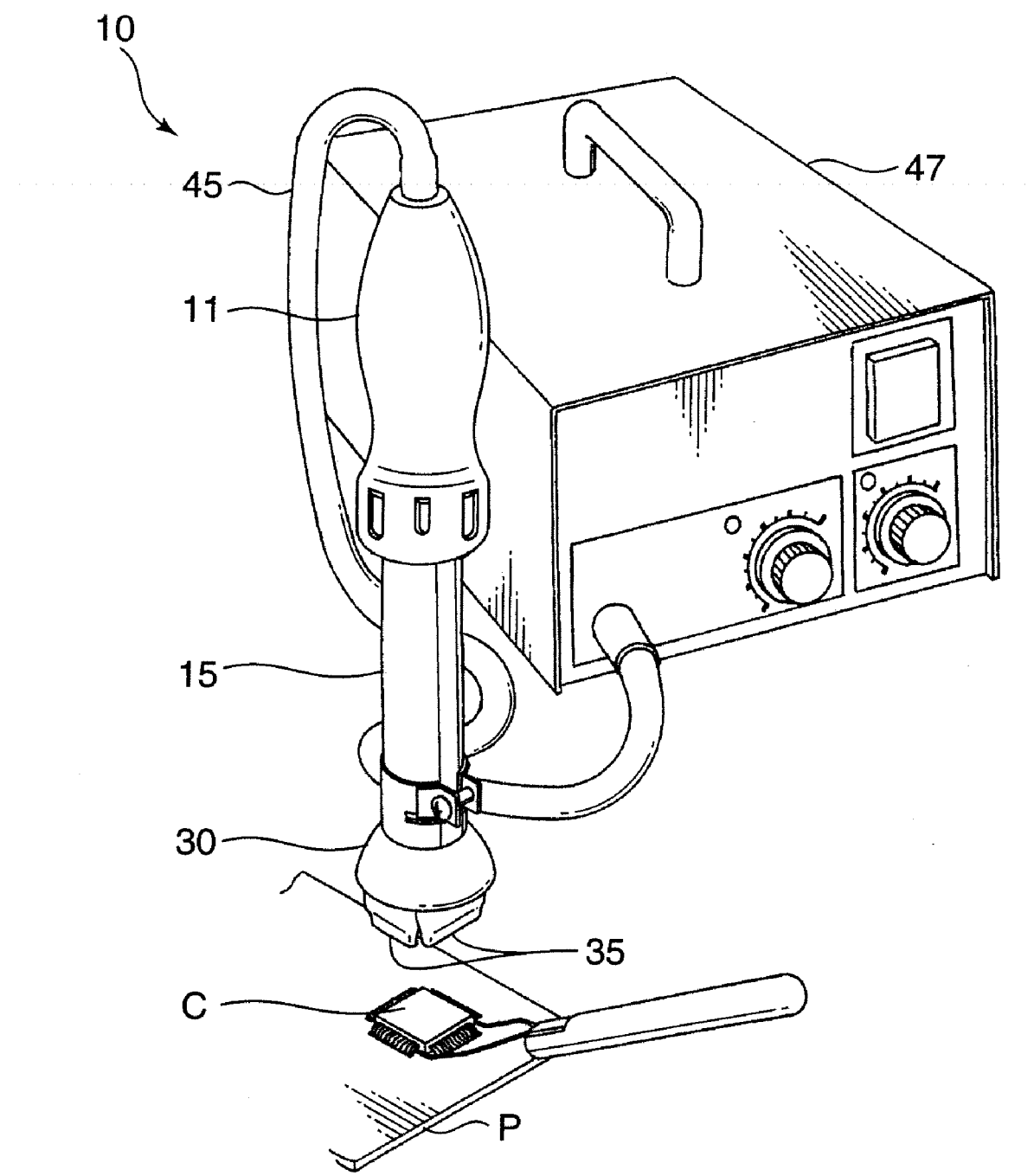
FIG. 1 is a perspective view illustrating an entire construction of a hot air blower of a first embodiment according to the present invention.

FIG. 1 is a perspective view illustrating an entire construction of a hot air blower for solder treatment 10 (hereinafter referred to as hot air blower) of a first embodiment of the present invention. An outline construction of the hot air blower 10 comprises a station portion 47, a grip portion 11, and a nozzle pipe 15, and a nozzle 30 can be attached to the forward end of the nozzle pipe 15 as necessary. The station portion 47 and the grip portion 11 are connected to each other by a connection cable 45.

Though a detailed structure will be described in detail later, the hot air blower 10 is configured to blow out air fed from the station portion 47 from the forward end of the nozzle pipe 15. The nozzle pipe 15 incorporates a heater generating heat by power supplied from the station portion 47, and the air is heated and blown out as hot air. Setting at the station portion 47 can be adjusted to the maximum air amount of 23 liters/min and hot air temperature of 100° C. to 500° C., for example.

FIG. 1 shows a work state where an electronic part C soldered to a print board P with the hot air blower 10 is removed by melting the solder by hot air. The electronic part C shown in this figure is an IC chip in which an electrode is projected from each side of a body having a shape of a rectangular flat plate. In the case of such a part as this electronic part C as a target, hot air is not made to blow to the body of the electronic part C but is preferably to blow only to the electrode. At this time, it is preferable to attach the nozzle 30 to the forward end of the nozzle pipe 15 as shown in the figure. A forward end port 35 is provided along each side of the electronic part C at the forward end of the nozzle 30 so that the hot air is blown out of the forward end port 35.

Figure 2:
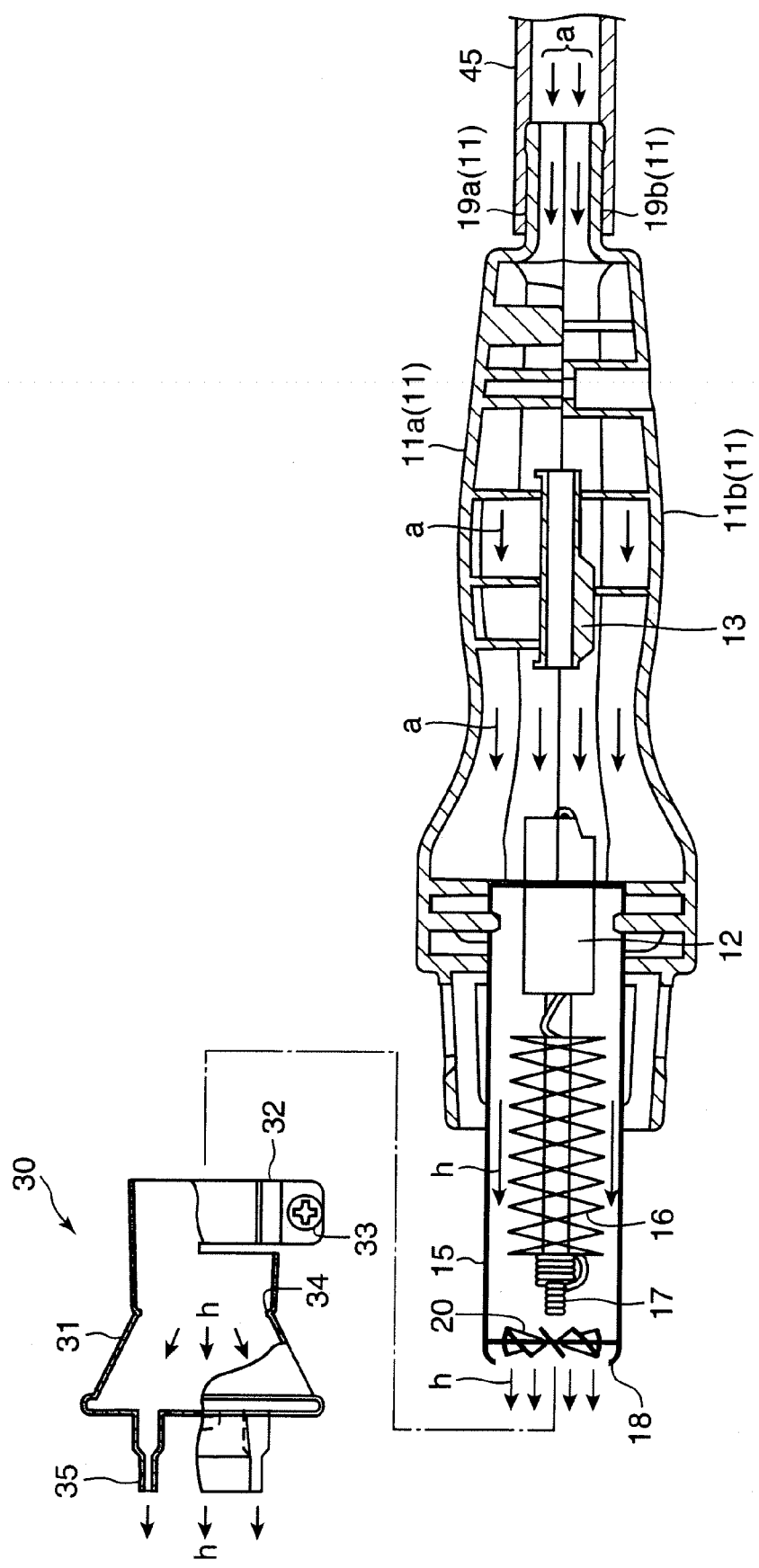
FIG. 2 is a sectional front view of a grip portion and a nozzle of the hot air blower of the first embodiment.
Figure 3:
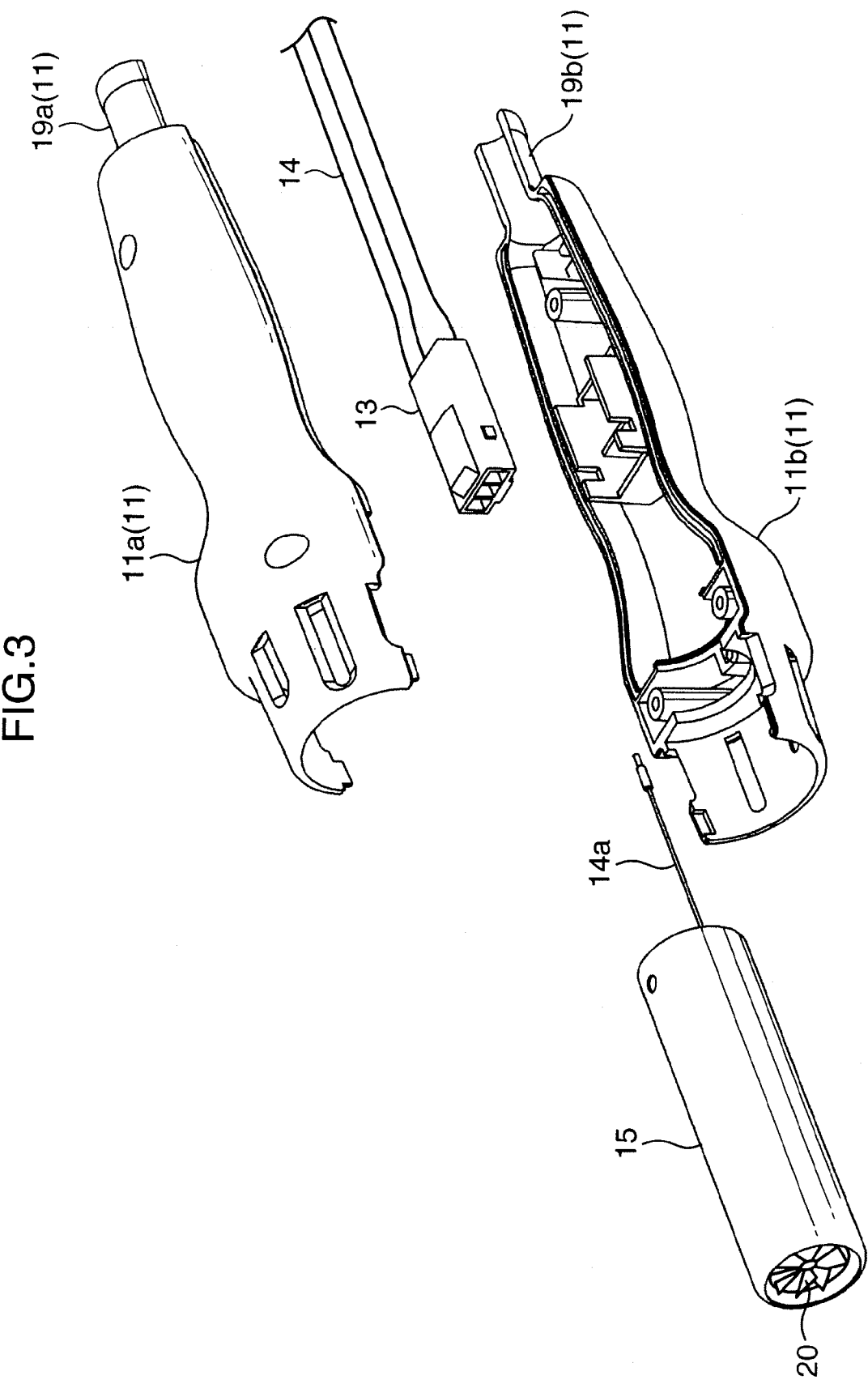
FIG. 3 is an exploded perspective view of the grip portion and a nozzle pipe of the hot air blower of the first embodiment.

FIG. 2 is a sectional front view of the grip portion 11 and the nozzle 30. Also, FIG. 3 is an exploded perspective view of the grip portion 11 and the nozzle pipe 15.

The grip portion 11 comprises a first grip portion 11a and a second grip portion 11b and is a cylindrical member having a space inside by abutting them to each other. At the forward end of the grip portion 11, the nozzle pipe 15 having a metal cylindrical body is provided. The nozzle pipe 15 incorporates a heat generation portion 16 including a heater core and a heat generating coil, a sensor portion 17 for detecting a temperature of the hot air, and a baffle device 20 for making a uniform temperature distribution of the hot air in the order from the tail end. The baffle device 20 is fixedly placed at a position receding toward the tail end from a hot-air blow-out port 18 at the forward end of the nozzle pipe 15.

Thus, the blower is configured so that the air passes through an in-blower air passage formed by the connection cable 45, the inside of the grip portion 11, and the inside of the nozzle pipe 15 and blows out of the hot-air blow-out port 18.

On a tail end of the nozzle pipe 15, a thermal switch 12 acting as a fuse at abnormal heating is provided. On a tail end of the thermal switch 12, a conductor 14a (omitted in FIG. 2) is connected to an electric cord 14 (omitted in FIG. 2) through a connection terminal 13. The electric cord 14 is connected to the station portion 47 through inside of the connection cable 45.

On the tail end of the grip portion 11, a first and second cable connection portions 19a, 19b are provided, and the connection cable 45 is connected.

The nozzle 30 is comprised by a substantially cylindrical nozzle body 31 having an end wall whose diameter is expanded on the forward end and the forward end port 35 formed at the forward end of the nozzle body 31. On the tail end of the nozzle body 31, a flexible portion 32 whose diameter can be desirably increased or decreased by a mounting screw 33 is provided.

The inner diameter on the tail end of the nozzle 30 is substantially equal to the outer diameter of the nozzle pipe 15, and the nozzle 30 is attached by inserting the forward end of the nozzle pipe 15 into the nozzle body 31. It is so constructed that the insertion of the nozzle pipe 15 is stopped by a stopper portion 34 whose diameter is smaller in the vicinity of the center in the axial direction of the nozzle body 31. Since the hot-air blow-out port 18 is connected to the stopper portion 34 when the nozzle 30 is attached, the stopper portion 34 is made as a tail end port for receiving the hot air from the hot-air blow-out port 18.

The forward end port 35 of this embodiment is connected to the nozzle body 31 at the tail end, and the forward end is configured to open along each side of a rectangle. Therefore, the nozzle body 31 is an in-nozzle air passage having the stopper portion 34 (tail end port) and the forward end port 35 communicate with each other.

Figure 4A:
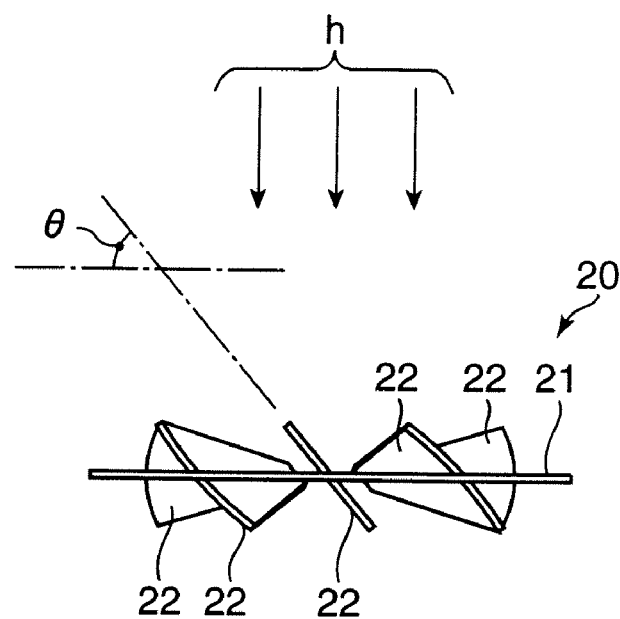
FIG. 4A is a front view
Figure 4B:
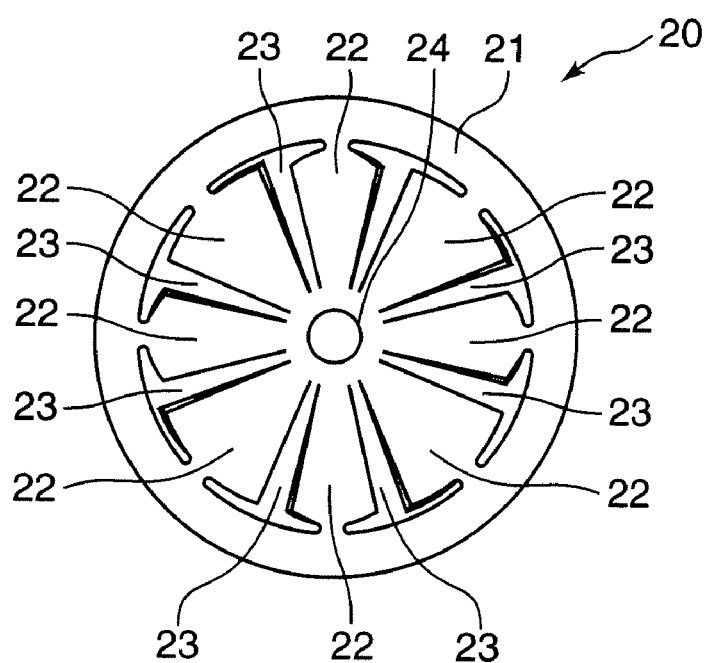
FIG. 4B is a plan view.

FIG. 4 are views of the baffle device 20, in which FIG. 4A is a front view and FIG. 4B is a plan view. The baffle device 20 is in a simple structure that radial slits 23 with an interval of approximately 45° are provided from the vicinity of the center on a board 21 in a disk shape, a single vane 22 is constituted by a portion between the adjacent slits 23, and each vane 22 is bent with an inclination angle θ (θ=45° in this embodiment) with respect to the board 21. The vanes 22 are formed in eight pieces. A center hole 24 is provided at the center of the board 21.

Next, operation of the hot air blower 10 will be described. As preparation for work, first, the nozzle 30 is attached to the nozzle pipe 15. Specifically, by loosening the mounting screw 33, the nozzle 30 is attached to the forward end of the nozzle pipe 15, and the mounting screw 33 is tightened and fixed at a position where the hot-air blow-out port 18 is brought into contact with the stopper portion 34.

Then, a worker switches on the station portion 47 and sets the air amount and the temperature of the hot air to desired values. An air a of the set air amount (See FIG. 2) is guided into the grip portion 11 through the inside of the connection cable 45 and further guided into the nozzle pipe 15.

On the other hand, power from the station portion 47 is supplied to the heat generation portion 16 via the electric cord 14. Since heat generated at the heat generation portion 16 is supplied to the air a, the air a becomes a hot air h during passage through the nozzle pipe 15. The sensor portion 17 detects the temperature of the hot air h, and the information is fed back to the station portion 47. At the station portion 47, the supply power is adjusted as necessary so that the temperature of the hot air h detected by the sensor portion 17 becomes the set temperature.

The hot air h having passed through the sensor portion 17 is guided to the baffle device 20. As shown in FIG. 4A, since the vanes 22 of the baffle device 20 are inclined by the inclination angle θ (45°) with respect to the flow direction of the hot air h, the hot air h hits the fixed vanes 22 obliquely, the flow is made into complicated currents by the reaction, and uniformity of the temperature distribution is promoted. Also, the hot air h at the center portion also flows outward and promotes heat exchange with the nozzle body 31. That is, the nozzle body 31 is actively heated.

After that, the hot air h blows out of the forward end of the forward end port 35 through the inside of the nozzle body 31. The blown out hot air h hits a spot where an electrode of the electronic part C is soldered (solder treatment portion) in a concentrated manner. Since the temperature distribution of the hot air is uniformed, the solder is melted evenly, and the electronic part C can be quickly removed from the print board P.

Figure 5A:
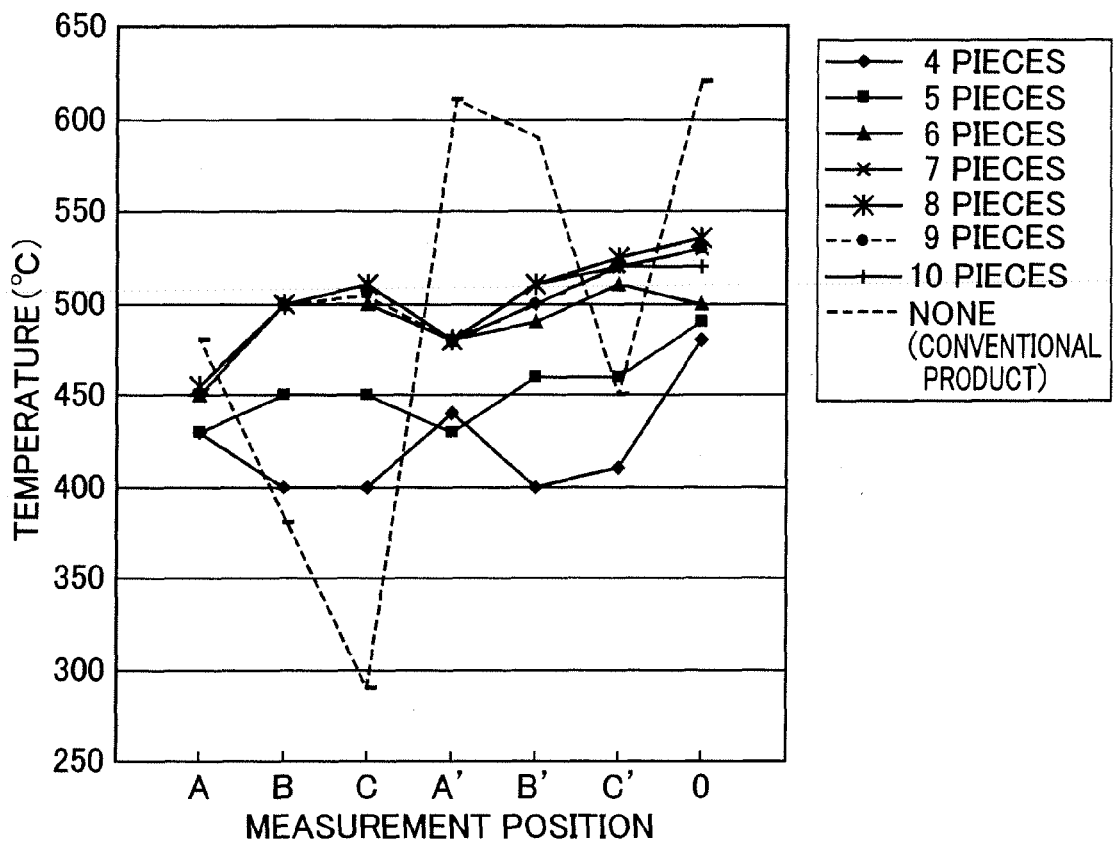
FIG. 5A is a graph illustrating a relation between the number of vanes provided at the baffle device and temperature distribution in the hot air blower of the first embodiment and FIG. 5B is an explanatory view illustrating a temperature measurement portion in FIG. 5A.
Figure 5B:
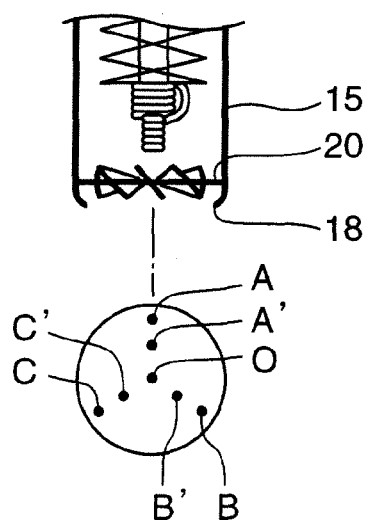

FIG. 5A is a graph illustrating a relation between the number of vanes 22 provided at the baffle device 20 and the temperature distribution of the hot air h blown out of the hot-air blow-out port 18. The horizontal axis indicates a measurement position and a vertical axis for an actually measured temperature (° C.). Measurement positions A, A', B, B', C, C' O are illustrated in FIG. 5B. That is, the vicinity of the center of the hot-air blow-out port 18 is the measurement position O and A-line, B-line, C-line are arranged radially therefrom. Those closer to the measurement position O are made as A', B', C', while those farther from the measurement position O as A, B, C, respectively.

The set temperature is 500° C. and the air amount is set at 20 liters/min. As a test sample, seven types of baffle devices 20 having four to 10 vanes 22 are prepared. The inclination angle of the vanes 22° is 45° for all. Also, as a comparative sample, a conventional product without the baffle device 20 is also prepared.

The test was conducted using these eight types of samples, and the result shown in the graph in FIG. 5A is obtained. In the case without the baffle device 20, there is a variation in the temperature depending on the measurement position from 290° C. to 620° C. (temperature range of 330° C.), while in the case of eight vanes 22, for example, the variation in temperature is 455° C. to 535° C. (temperature range of 80° C.). In the case of the other numbers, the variation was in a range of temperature of 80° C. or less for all. From the result, a great temperature uniformity effect by the baffle device 20 was confirmed. Particularly, in the case of the number of vanes 22 being six to ten, the temperature distribution is favorable centering on the set temperature of 500° C.

Figure 6:
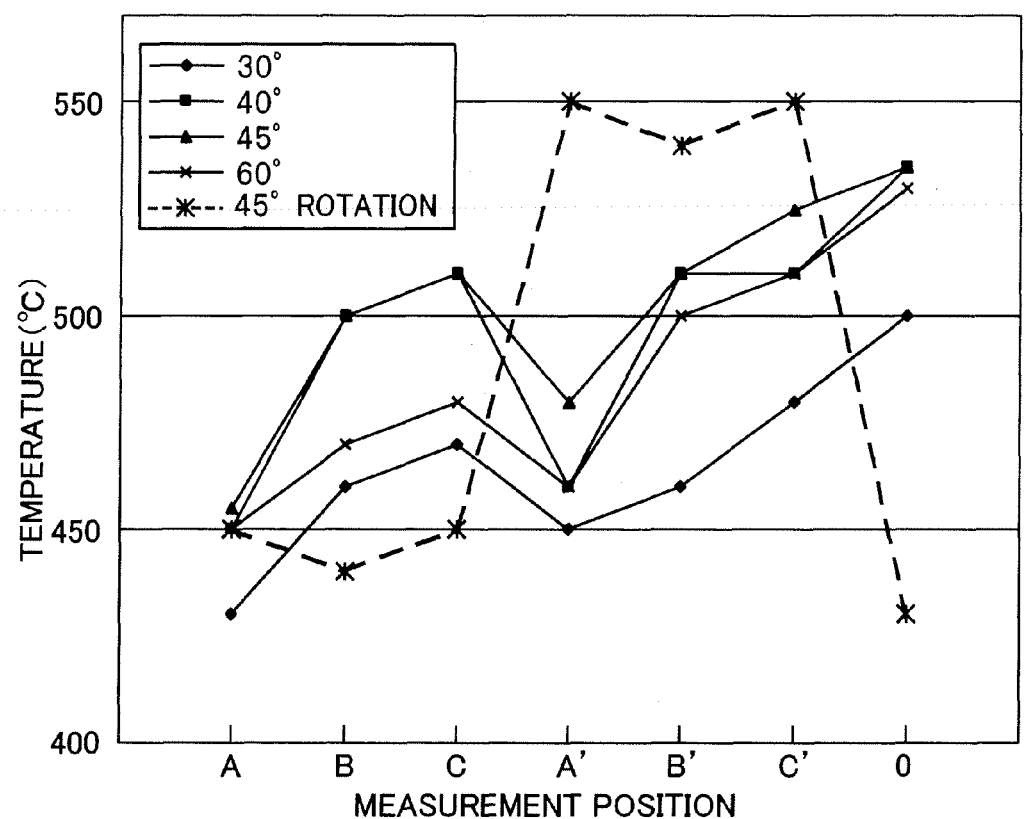
FIG. 6 is a graph illustrating a relation between an inclination angle of the vanes provided at the baffle device and temperature distribution in the hot air blower of the first embodiment.

FIG. 6 is a graph illustrating a relation between the inclination angle of the vane 22 provided at the baffle device 20 and the temperature distribution of the hot air h blown out of the hot-air blow-out port 18. The lateral axis shows the measurement position and the vertical axis shows the actually measured temperature (° C.). The measurement positions A, A', B, B', C, C', O are the same as FIG. 5B.

The set temperature is 500° C. and the air amount is 20 liters/min. As a test sample, four types of baffle devices 20 with the inclination angle of the vane 22 at 30°, 40°, 45°, 60° (all are fixedly attached to the nozzle pipe 15) are prepared. Also, for comparison, a comparative sample in which the inclination angle is set at 45° and the baffle device 20 is supported rotatably is prepared. The number of vanes 22 is eight for all.

The test was conducted using these five types of samples, and the result shown in the graph in FIG. 6 is obtained. In the case of the inclination angle of 45° (fixed), the temperature variation is 455° C. to 535° C. (temperature range of 80° C.). The temperature range is approximately 70° C. to 80° C. for the other inclination angles but in the case of the inclination angle of 45°, a favorable result close to the distribution centering on the set temperature 500° C. is obtained.

On the other hand, in the case where the baffle device 20 with the inclination angle of 45° is rotatably supported, the temperature variation undesirably comes into a range between 430° C. and 550° C. (temperature range of 120° C.). Moreover, any sample in which the baffle device 20 is fixed shows a stable tendency that the temperature becomes slightly high as it gets closer to the center (gentle upward slope to the right in the graph), while the rotating case shows great fluctuation and stability of the temperature is low.

The reason for that has not been fully clarified, but it is considered that in the case of the baffle device 20 being fixed, when the hot air h hits the baffle device 20, a large reaction is obtained and it greatly changes the direction of the flow (the flow is made into complicated currents and uniformity of the temperature distribution is promoted), while in the case of rotatable support, the obtained reaction is small and the direction of the flow is not changed a lot.

Also, there is a normal tendency that the closer to the outside in contact with the outer wall (the nozzle pipe 15, here) the hot air h gets, the lower the temperature becomes, but when the baffle device 20 is rotated, the tendency is remarkable. That is, the temperature is particularly low at the measurement positions A, B, C located far away from the measurement position O at the center. On the other hand, when the baffle device 20 is fixed, particularly the baffle device with the inclination angle of the vanes 22 close to 45°, the tendency is alleviated remarkably. It is considered that fixing of the baffle device 20 complicates the flow of the hot air h and a sufficient flow goes outward and heat exchange with the outer wall is promoted. That is, since the outer wall is warmed at first, the temperature drop in the vicinity of the outer wall is considered to be restricted. Also, no energy consumption for rotating the baffle device 20 is considered to work advantageously.

As is clear from the above, the hot air blower 10 can uniform the temperature distribution of the hot air h efficiently even with the simple structure by fixing the baffle device 20 having the simple structure in the air passage.

Figure 7A:
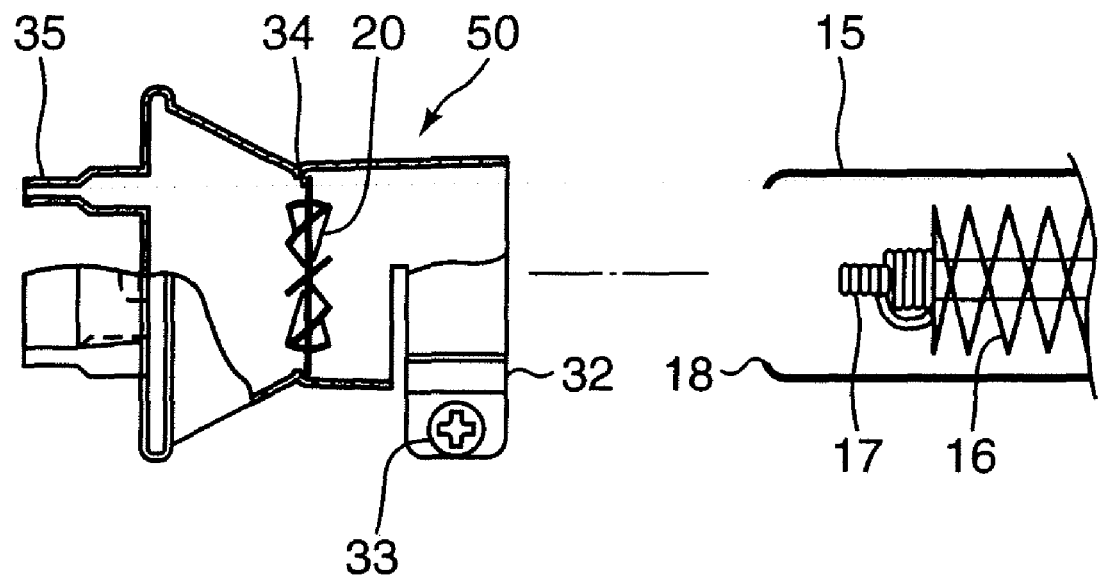
FIG. 7A is a sectional front view of a nozzle pipe and the vicinity of a nozzle and FIG. 7B is a side view of the nozzle.
Figure 7B:
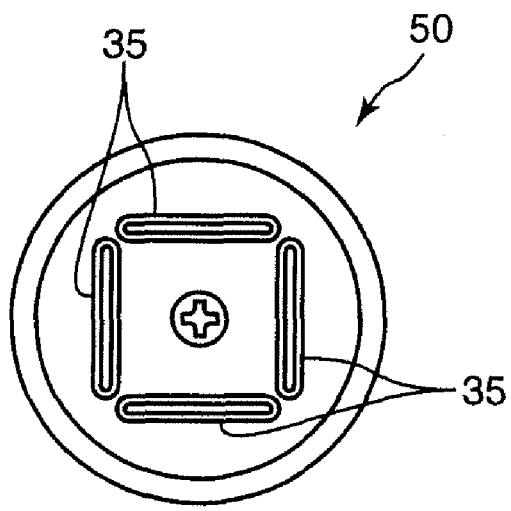

FIG. 7 are views of a hot air blower of a second embodiment according to the present invention, in which FIG. 7A is a sectional front view of the nozzle pipe 15 and the vicinity of the nozzle 50 and FIG. 7B is a side view of the nozzle 50. In each of the following embodiments, the members with the same or similar function as those of the first embodiment are given the same reference numerals as those in the first embodiment, and duplicated description will be omitted.

In this embodiment, the baffle device 20 is not provided in the nozzle pipe 15 but provided in the nozzle 50. In detail, the baffle device 20 is fixed to the tail end of the stopper portion 34. In this case, the effect by the baffle device 20 can be obtained on the premise of attachment of the nozzle 50. According to this configuration, only by changing a conventional nozzle to the nozzle 50 for the nozzle pipe 15 in the conventional structure without provision of the baffle device 20, the effect by the baffle device 20 can be obtained easily.

Figure 8B:
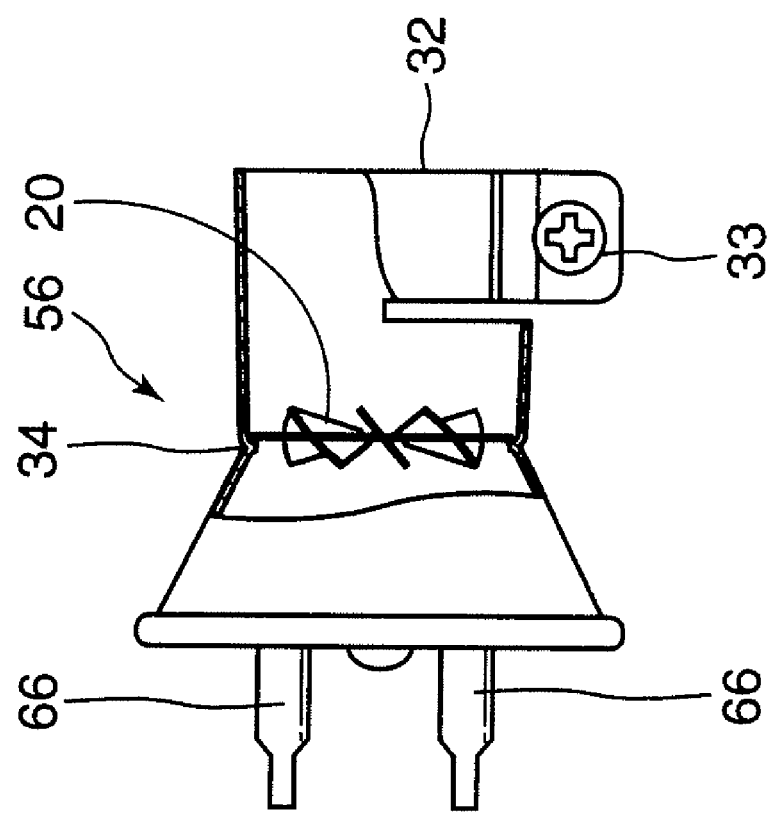
FIG. 8A is a side view and FIG. 8B is a front view having a partial notch.
Figure 8A:
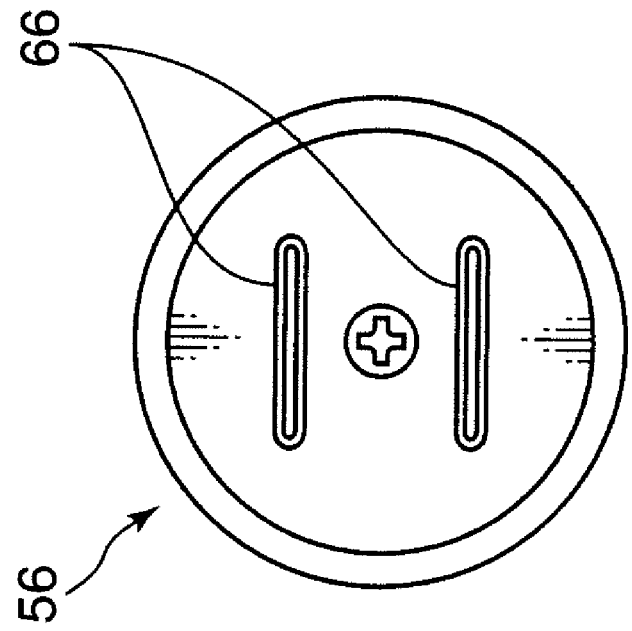

FIG. 8 are views illustrating a variation of the nozzle of the second embodiment, in which FIG. 8A is a side view and FIG. 8B is a front view having a partial notch. At a nozzle 56, forward end ports 66 are provided along a pair of opposite sides of a rectangle. Therefore, this is suitable for solder treatment of the electronic part C in which electrodes are provided along the pair of opposite sides of the rectangle.

Figure 9B:
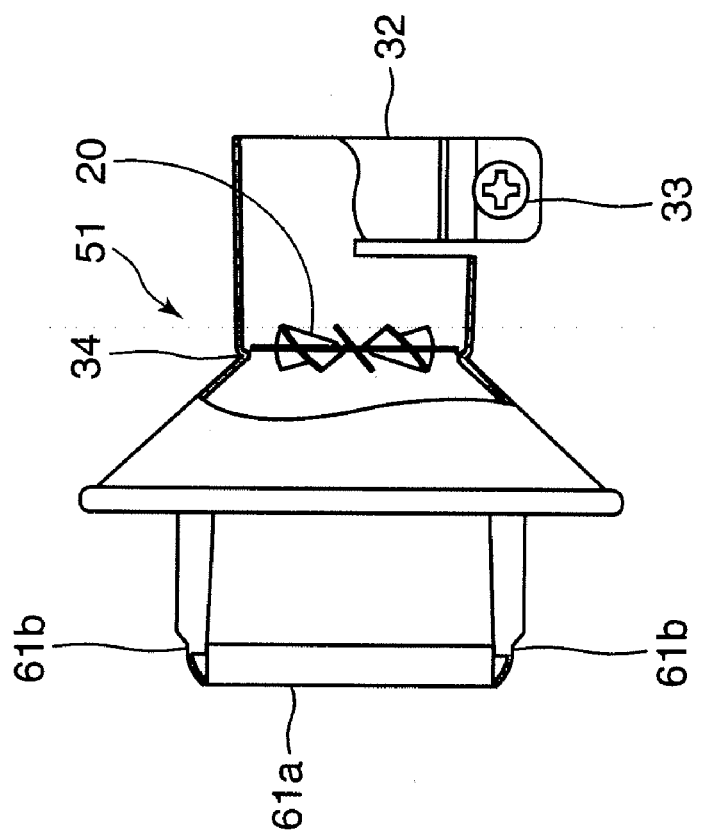
FIG. 9A is a side view and FIG. 9B is a front view having a partial notch.
Figure 9A:
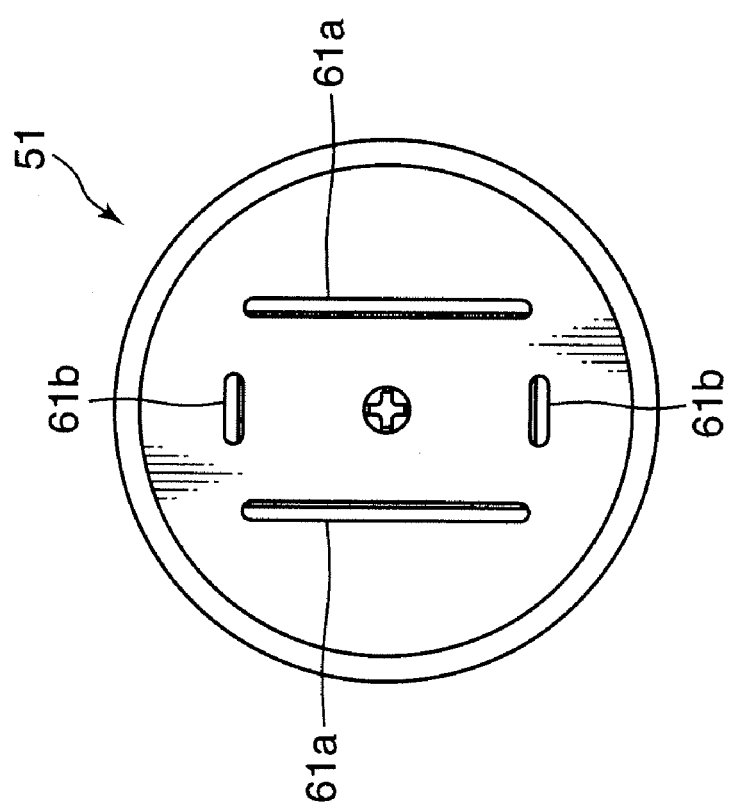

FIG. 9 are views illustrating a variation of the nozzle of the second embodiment, in which FIG. 9A is a side view and FIG. 9B is a front view having a partial notch. At a nozzle 51, forward end ports 61a, 61b are provided along each side of a rectangle in which the lengths of the adjacent sides are different. Therefore, this is suitable for solder treatment of the electronic part C in which the electrodes are provided along each side of this rectangle. Also, the forward end of the forward end ports 61a, 61b is curved inward. This is suitable for solder treatment of the electronic part C in which an electrode is bent into the lower side of the electronic part C (PLCC: Plastic Leaded Chip Carrier, for example).

FIG. 10 are views illustrating a variation of the nozzle of the second embodiment, in which FIG. 10A is a side view and FIG. 10B is a front view having a partial notch. At a nozzle 52, forward end ports 62 are provided along long sides of a rectangle in which the lengths of the adjacent sides are different. Therefore, this is suitable for solder treatment of the electronic part C in which electrodes are provided along the long sides of this type of rectangle. Also, the shape of the forward end port 62 is suitable for solder treatment of PLCC and the like similarly to the forward end ports 61*a*, 61*b* in FIG. 9.

FIG. 11 are views illustrating a variation of the nozzle of the second embodiment, in which FIG. 11A is a side view and FIG. 11B is a front view having a partial notch. At a nozzle 53, a forward end port 63 covering the entire inside of a rectangle is provided. Therefore, this is suitable for solder treatment of the electronic part C (BGA: Ball Grid Array, for example) having an electrode surfacingly expanded over the lower face of the electronic part C.

FIG. 12 are views illustrating a variation of the nozzle of the second embodiment, in which FIG. 12A is a side view and FIG. 12B is a front view having a partial notch. At a nozzle 54, a straight forward end port 64 is provided. Therefore, this is suitable for solder treatment of the electronic part C in which electrodes arranged on a straight line are provided.

FIG. 13 are views illustrating a variation of the nozzle of the second embodiment, in which FIG. 13A is a side view and FIG. 13B is a front view having a partial notch. At a nozzle 55, a forward end port 65 in a small-diameter pipe shape is provided in an inclined manner. Therefore, this is particularly suitable for solder treatment of a small chip part or the like. The forward end port 65 may not be inclined.

Figure 14:
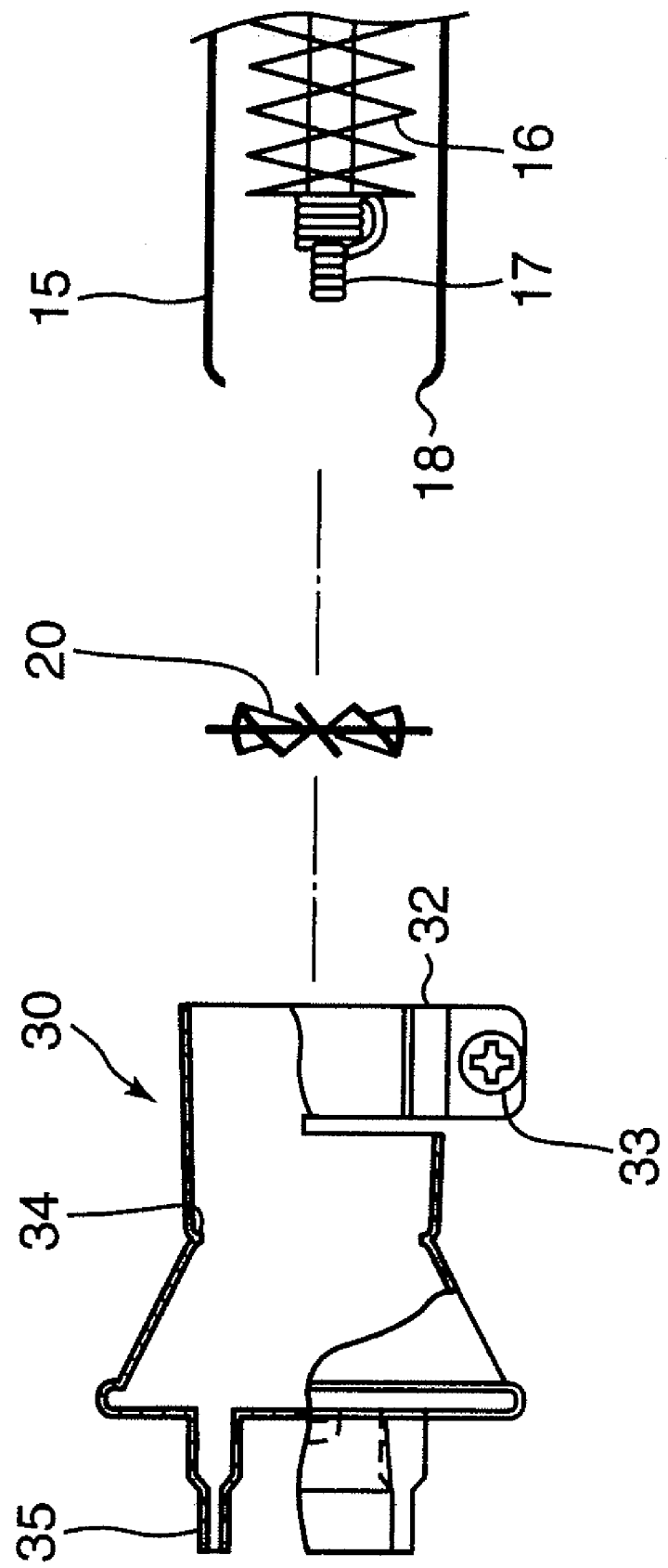
FIG. 14 is a sectional front view of a nozzle pipe, a baffle device and the vicinity of a nozzle of a hot air blower of a third embodiment according to the present invention.

FIG. 14 is a sectional front view of the nozzle pipe 15, the baffle device 20 and the vicinity of the nozzle 30 of a hot air blower of a third embodiment according to the present invention. In the present embodiment, the baffle device 20 is not fixed to the nozzle pipe 15 or the nozzle 30 but is an independent member. And when the nozzle 30 is to be attached to the nozzle pipe 15, the baffle device 20 is configured to be fixed by being held by the hot-air blow-out port 18 and the stopper portion 34. In this case, the effect by the baffle device 20 can be obtained on the premise that the nozzle 50 is attached and the baffle device 20 is inserted in it at attachment. According to this configuration, the effect by the baffle device 20 can be obtained easily only by separately preparing and inserting the baffle device 20 without changing the nozzle pipe 15 and the nozzle 30 in the conventional structure without the baffle device 20 provided.

Figure 15:
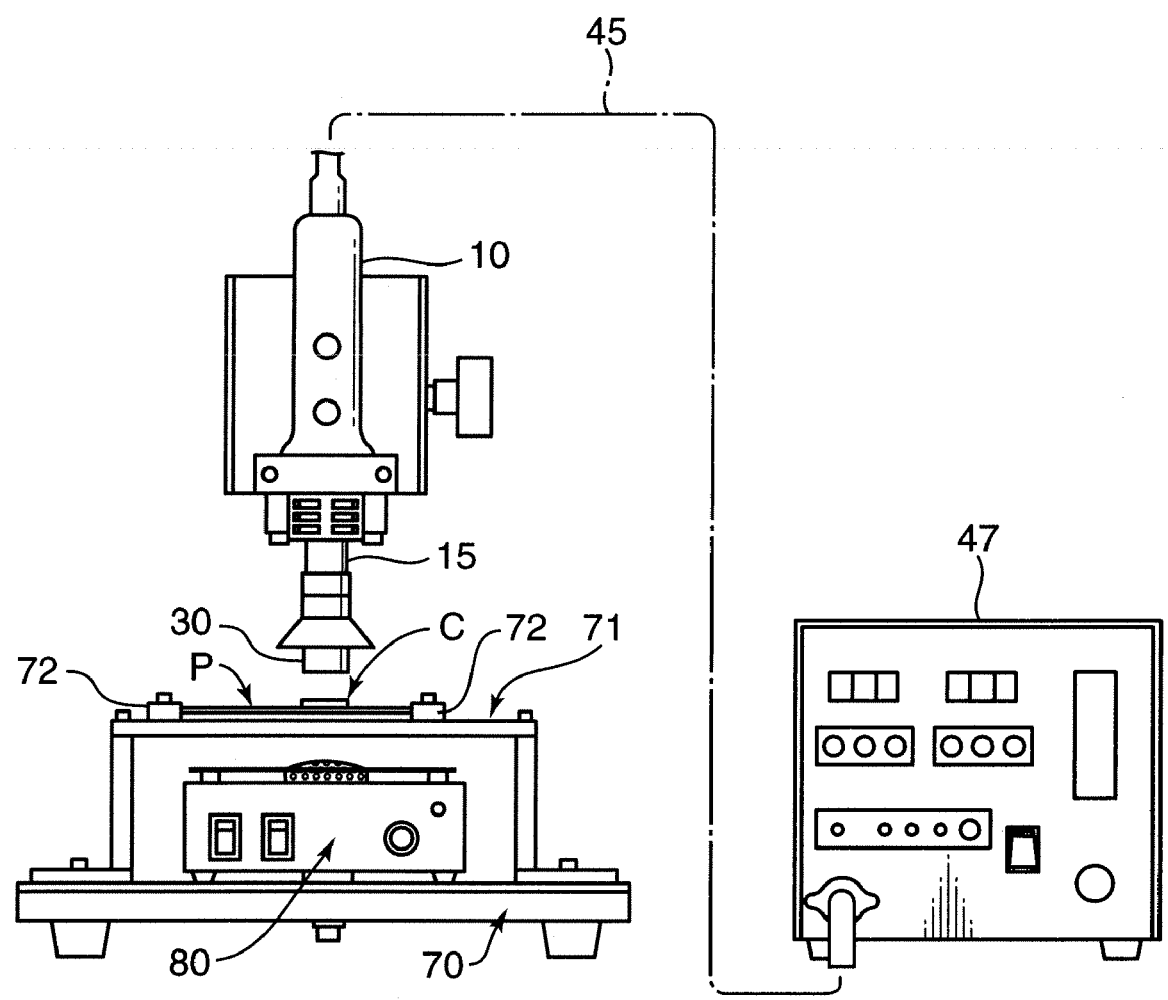
FIG. 15 is a front view illustrating an entire construction of a hot air blower of a fourth embodiment according to the present invention.

FIG. 15 is a front view illustrating an entire configuration of a hot air blower of a fourth embodiment according to the present invention. In this configuration, the hot air is blown out by the hot air blower 10 from above the electronic part C and moreover, a pre-heater 80 (one form of the hot air blower) is configured to blow the hot air from below. That is, since the hot air is blown from both above and below, this device configuration is suitable for soldering work or the like of the above BGA in which an electrode is provided on the lower surface.

A mounting table 71 is provided away above a stand 70, and a holding member 72 is further provided on that. The holding member 72 holds a print board P. On the print board P, the electronic part C is mounted (in the case of soldering). And the hot air blower 10 is set so that the hot air is blown out from above the electronic part C.

On the other hand, below the mounting table 71, the pre-heater 80 is provided. The pre-heater 80 is configured to blow out hot air upward from below.

Figure 16A:
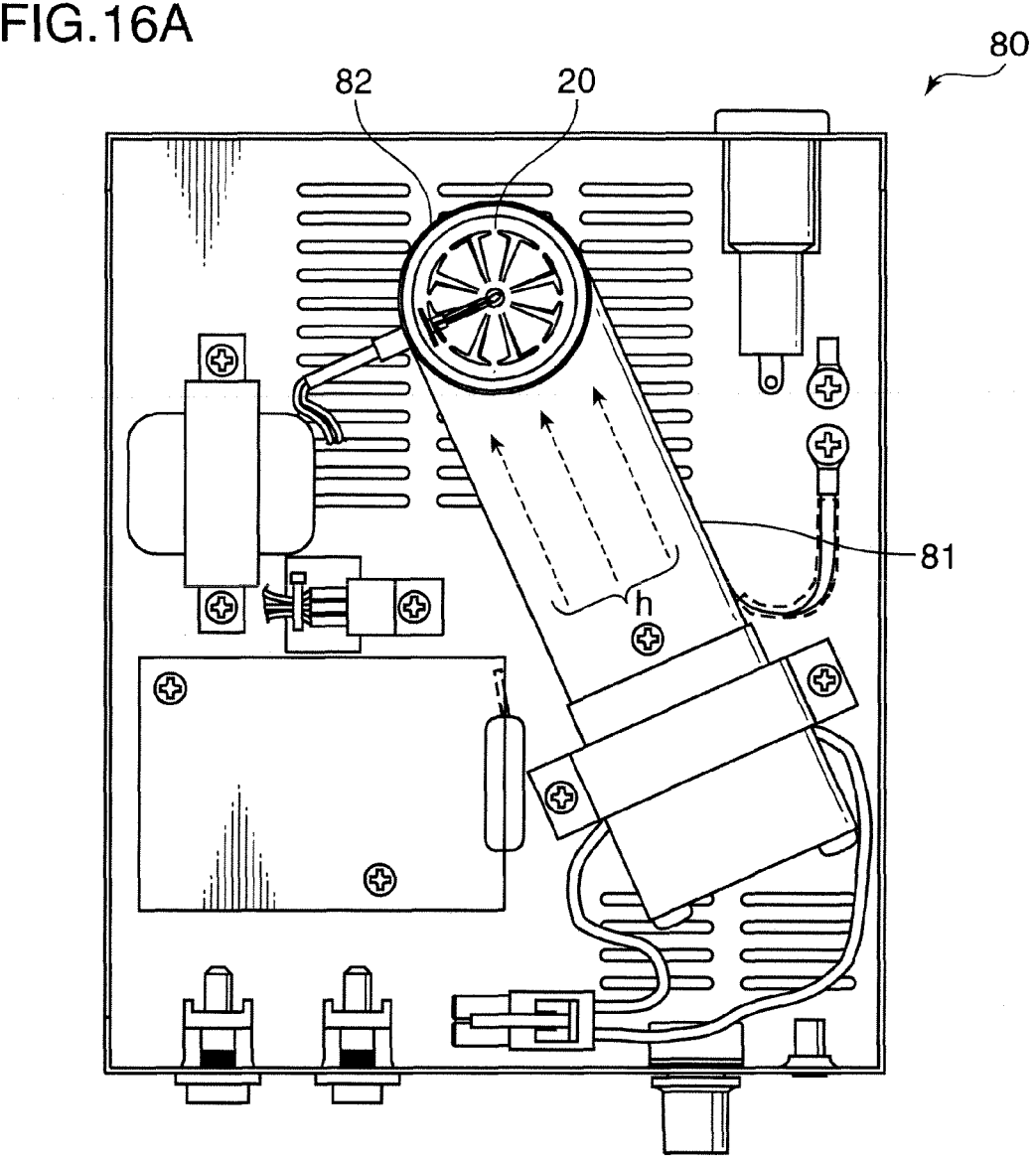
FIG. 16A is a plan view and FIG. 16B is a front view.
Figure 16B:
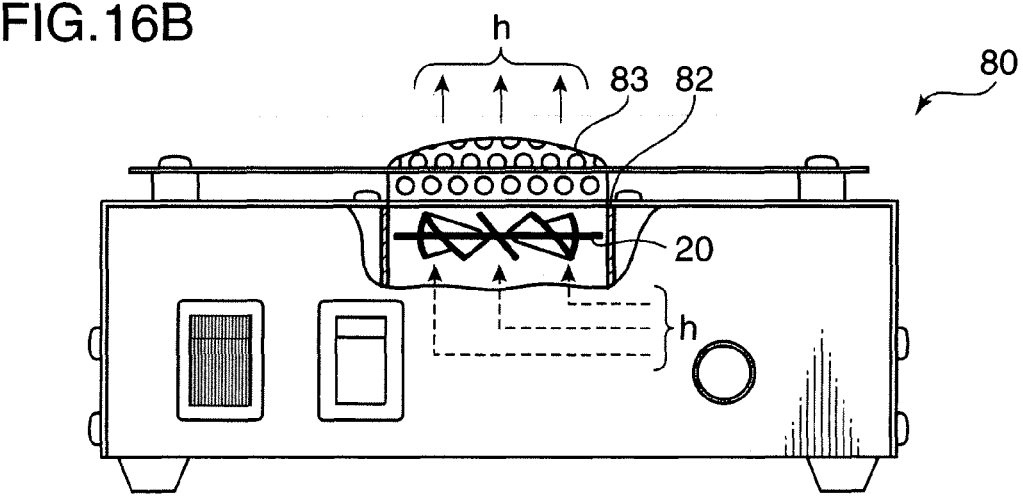

FIG. 16 are views of the pre-heater 80, in which FIG. 16A is a plan view and FIG. 16B is a front view. Since the basic structure of the pre-heater 80 is conventional well-known one, the detailed description will be omitted, but a heat generation portion is provided inside an air passage 81, and air having passed through this becomes the hot air h. The hot air h is blown out upward from a hot-air blow-out port 82. The baffle device 20 is fixedly provided on the immediately upstream side of the hot-air blow-out port 82. Also, at the hot-air blow-out port 82, a cover 83 in which a large number of holes are drilled is provided (omitted in FIG. 16A).

When the pre-heater 80 is operated, the hot air h in which temperature distribution is uniformed by the baffle device 20 is blown out to the upper part of the cover 83. The hot air h evenly heats the electrodes on the lower face of the electronic part C. Also, from the hot air blower 10 above, the hot air h in which uniformity of temperature distribution is promoted by the baffle device 20 is blown out. By this hot air h blown from above and below, solder is evenly melted and favorable soldering is enabled smoothly.

The embodiments of the present invention have been described, but the present invention is not limited to the above embodiments but various variations are possible within a range of the invention described in claims. For example, the board 21 of the baffle device 20 does not have to be circular but may be a polygon or any other shapes. Also, the baffle device 20 does not have to be produced from a single board 21 but may be produced by joining a plurality of vanes 22. The number of vanes 22 is preferably four to ten and particularly preferably six to ten, however, it may be the number other than those. The inclination angle of the vane 22 is preferably 30 to 60° and particularly preferably 45°, but the other inclination angles will do.

Also, in the above embodiments, the baffle device 20 is provided either at the nozzle pipe 15, the nozzle 50 or between the nozzle pipe 15 and the nozzle 30, but both may be used at the same time. For example, the baffle device 20 may be fixedly provided both at the nozzle pipe 15 and the nozzle 50.

As described above, a baffle device is provided fixedly in an air passage in a mechanism for blowing out hot air to a solder treatment portion. The baffle is provided with vanes inclined with a predetermined inclination angle with respect to an air flow substantially radially with a predetermined interval.

The baffle device preferably has a structure that radial slits are provided with a predetermined interval on a flat board to constitute a single vane with a portion between the adjacent slits and each vane is bent with the predetermined inclination angle with respect to the board.

The number of vanes is preferably four or more and ten or less, and the predetermined inclination angle is preferably 30 degrees or more and 60 degrees or less.

Also, a nozzle is detachably attached to a hot-air blow-out port of a hot air blower for solder treatment which blows out hot air to a solder treatment portion. The nozzle is provided with a tail end port for receiving the hot air from the hot air blow-out port, a forward end port for blowing out the received hot air and an in-nozzle air passage for having the tail end port and the forward end port communicate with each other. A baffle device is fixedly provided in the in-nozzle air passage.

Further, a hot air blower is used for solder treatment which blows out hot air to a solder treatment portion. The hot air blower is provided with an in-blower air passage for guiding the hot air to a hot-air blow-out port and a heater provided in the in-blower air passage for heating the air. A baffle device is fixedly provided on the downstream side of the heater.

Moreover, a hot air blower is used for solder treatment which blows out hot air to a solder treatment portion. The hot air blower is provided with an in-blower air passage for guiding the hot air to a hot-air blow-out port, a heater in the in-blower air passage for heating the air, and a nozzle detachably attached to the hot-air blow-out port for guiding the hot air received from the tail end port to the forward end port via the in-nozzle air passage. A baffle device is detachably provided at a boundary portion between the hot-air blow-out port and the tail end port.

With these constructions, the hot air hits the vanes of the fixed baffle device obliquely, which makes complicated currents by reaction and promotes uniformity of temperature distribution. Moreover, a control plate with a through hole obliquely drilled or a structure for rotating a fan is not needed. Also, a part of thermal energy of the hot air is not consumed by driving of the rotating fan. That is, uniformity of temperature distribution of hot air can be realized efficiently even with a simple structure.

In a hot air blower for solder treatment which blows out hot air to a solder treatment portion at solder treatment such as soldering, removal of soldered part and the like, accordingly, temperature distribution of the hot air can be uniformed efficiently even with a simple structure.

The invention claimed is:

1. A nozzle for a hot air blower for solder treatment, which is detachably attached to a hot-air blow-out port of the hot air blower for solder treatment which blows out hot air to a solder treatment portion, comprising:
    a tail end port for receiving hot air from the hot-air blow-out port;
    a forward end port for blowing out the received hot air;
    an in-nozzle air passage for having the tail end port and the forward end port communicating with each other; and
    a baffle is fixedly provided in the in-nozzle air passage, the baffle device including a plurality of vanes inclined with a predetermined inclination angle with respect to an air flow and arranged substantially radially with a predetermined interval.

2. A hot air blower for solder treatment which blows out hot air to a solder treatment portion, comprising:
    an in-blower air passage for guiding the air to a hot-air blow-out port;
    a heater provided in the in-blower air passage for heating the air; and
    a baffle device fixedly provided on the downstream side of the heater, the baffle device including a plurality of vanes inclined with a predetermined inclination angle with respect to an air flow and arranged substantially radially with a predetermined interval.

3. A hot air blower for solder treatment which blows out hot air to a solder treatment portion, comprising:
    an in-blower air passage for guiding the air to a hot-air blow-out port;
    a heater provided in the in-blower air passage for heating the air;
    a nozzle detachably attached to the hot-air blow-out port for guiding the hot air received from the tail end port to the forward end port via the in-nozzle air passage; and
    a baffle device detachably provided at a boundary portion between the hot-air blow-out port and the tail end port, the baffle device including a plurality of vanes inclined with a predetermined inclination angle with respect to an air flow and arranged substantially radially with a predetermined interval.

4. The nozzle for a hot air blower for solder treatment according to claim 1, wherein the baffle device has a structure that radial slits are provided with a predetermined interval on a flat board to constitute a single vane with a portion between the adjacent slits and each vane is bent with the predetermined inclination angle with respect to the board.

5. The nozzle for a hot air blower for solder treatment according to claim 1, wherein the number of vanes is four or more and ten or less.

6. The nozzle for a hot air blower for solder treatment according to claim 1, wherein the predetermined inclination angle is 30 degrees or more and 60 degrees or less.

7. A hot air blower for solder treatment which blows out hot air to a solder treatment portion, comprising:
    an in-blower air passage for guiding the air to a hot-air blow-out port;
    a heater provided in the in-blower air passage for heating the air; and
    a baffle device fixedly provided on the downstream side of the heater, the baffle device including a plurality of vanes inclined with a predetermined inclination angle with respect to an air flow and arranged substantially radially with a predetermined interval, wherein the baffle device has a structure that radial slits are provided with a predetermined interval on a flat board to constitute a single vane with a portion between the adjacent slits and each vane is bent with the predetermined inclination angle with respect to the board.

8. The hot air blower for solder treatment according to claim 2, wherein the number of vanes is four or more and ten or less.

9. A hot air blower for solder treatment which blows out hot air to a solder treatment portion, comprising:
    an in-blower air passage for guiding the air to a hot-air blow-out port;
    a heater provided in the in-blower air passage for heating the air; and
    a baffle device fixedly provided on the downstream side of the heater, the baffle device including a plurality of vanes inclined with a predetermined inclination angle with respect to an air flow and arranged substantially radially with a predetermined interval, wherein the predetermined inclination angle is 30 degrees or more and 60 degrees or less.

10. The hot air blower for solder treatment according to claim 3, wherein the baffle device has a structure that radial slits are provided with a predetermined interval on a flat board to constitute a single vane with a portion between the adjacent slits and each vane is bent with the predetermined inclination angle with respect to the board.

11. The hot air blower for solder treatment according to claim 3, wherein the number of vanes is four or more and ten or less.

12. The hot air blower for solder treatment according to claim 3, wherein the predetermined inclination angle is 30 degrees or more and 60 degrees or less.

13. The hot air blower for solder treatment according to claim 7, wherein the number of vanes is four or more and ten or less.

14. The hot air blower for solder treatment according to claim 7, wherein the predetermined inclination angle is 30 degrees or more and 60 degrees or less.

15. The hot air blower for solder treatment according to claim 9, wherein the number of vanes is four or more and ten or less.

* * * * *